(No Model.) 5 Sheets—Sheet 1.
C. A. DIXON.
VALVE MECHANISM.

No. 319,802. Patented June 9, 1885.

Witnesses:
Jas. E. Hutchinson
Henry C. Hazard

Inventor
Chas. A. Dixon, by
Prindle & Russell, his Attys (No Model.)  5 Sheets—Sheet 2.

C. A. DIXON.
VALVE MECHANISM.

No. 319,802. Patented June 9, 1885.

Witnesses:
Jas. E. Hutchinson.
Henry C. Hazard.

Inventor.
Chas. A. Dixon, by
Prindle & Russell, his Attys.

N. PETERS, Photo-Lithographer, Washington, D. C.

(No Model.)  5 Sheets—Sheet 3.

C. A. DIXON.
VALVE MECHANISM.

No. 319,802. Patented June 9, 1885.

Witnesses:
Jas. E. Hutchinson.
Henry C. Hazard.

Inventor:
Chas. A. Dixon, by
Prindle and Russell, his Attys (No Model.)  5 Sheets—Sheet 4.
C. A. DIXON.
VALVE MECHANISM.

No. 319,802. Patented June 9, 1885.

Witnesses:
Jas. E. Hutchinson
Henry C. Hazard

Inventor.
Chas. A. Dixon, by
Prindle & Russell, his Attys (No Model.) 5 Sheets—Sheet 5.

C. A. DIXON.
VALVE MECHANISM.

No. 319,802. Patented June 9, 1885.

Witnesses:
Jas. E. Hutchinson.
Henry C. Hazard.

Inventor.
Chas. A. Dixon, by
Prindle and Russell, his Attys.

UNITED STATES PATENT OFFICE.

CHARLES A. DIXON, OF NEWBURG, NEW YORK, ASSIGNOR TO ROBERT WHITEHILL, OF SAME PLACE.

VALVE MECHANISM.

SPECIFICATION forming part of Letters Patent No. 319,802, dated June 9, 1885.

Application filed January 13, 1885. (No model.)

*To all whom it may concern:*

Be it known that I, CHAS. A. DIXON, of Newburg, in the county of Orange, and in the State of New York, have invented certain new and useful Improvements in Valve Mechanisms; and I do hereby declare that the following is a full, clear, and exact description thereof, reference being had to the accompanying drawings, in which—

Figure 1:
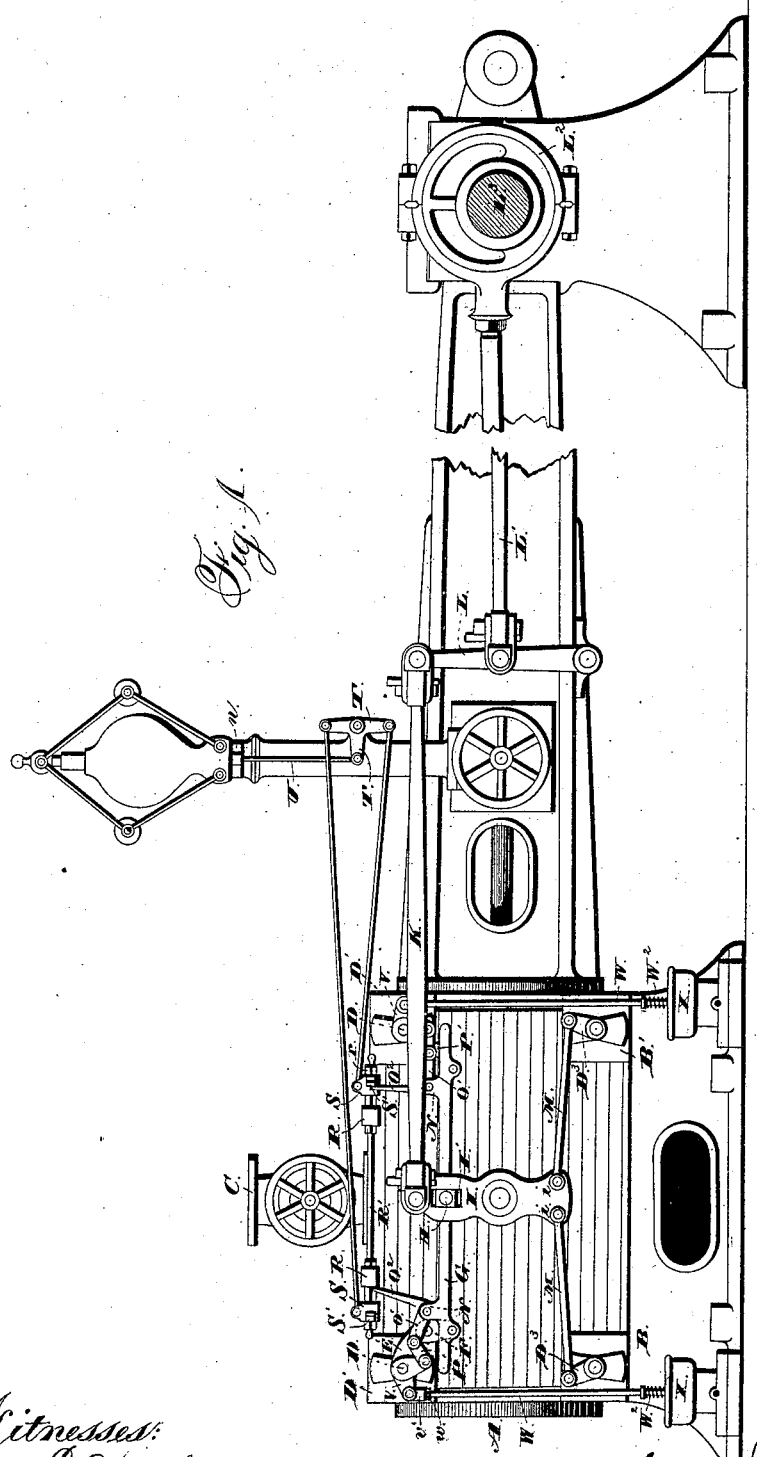
Figure 2:
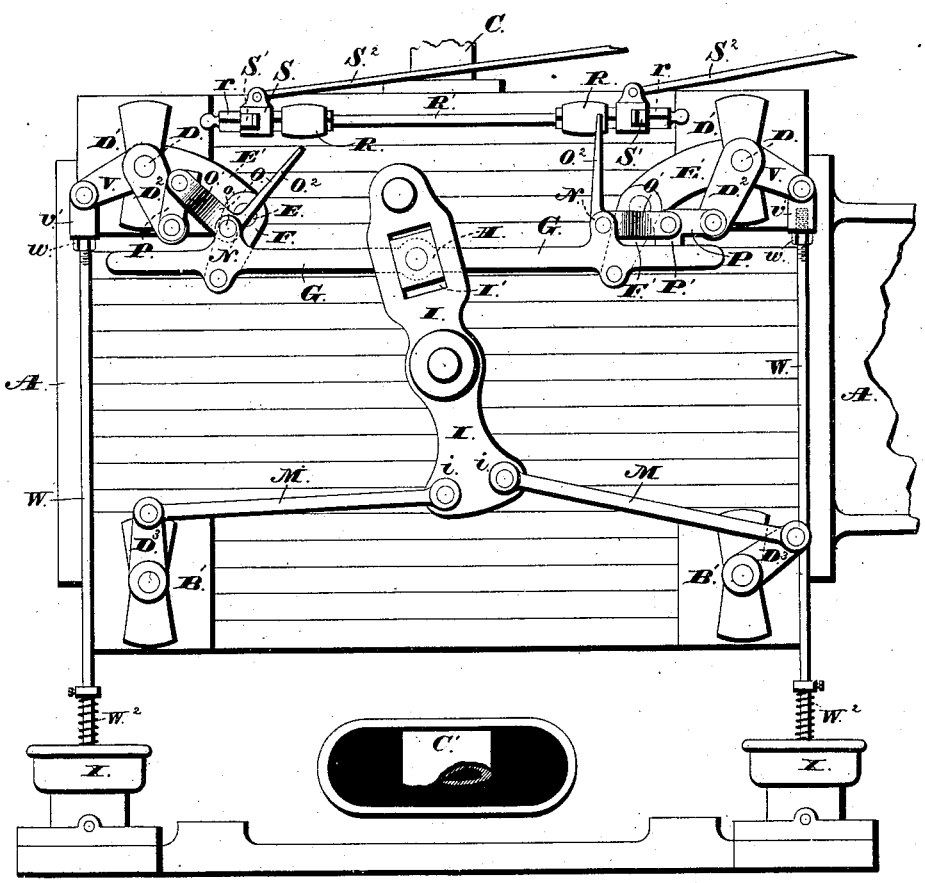
Figure 3:
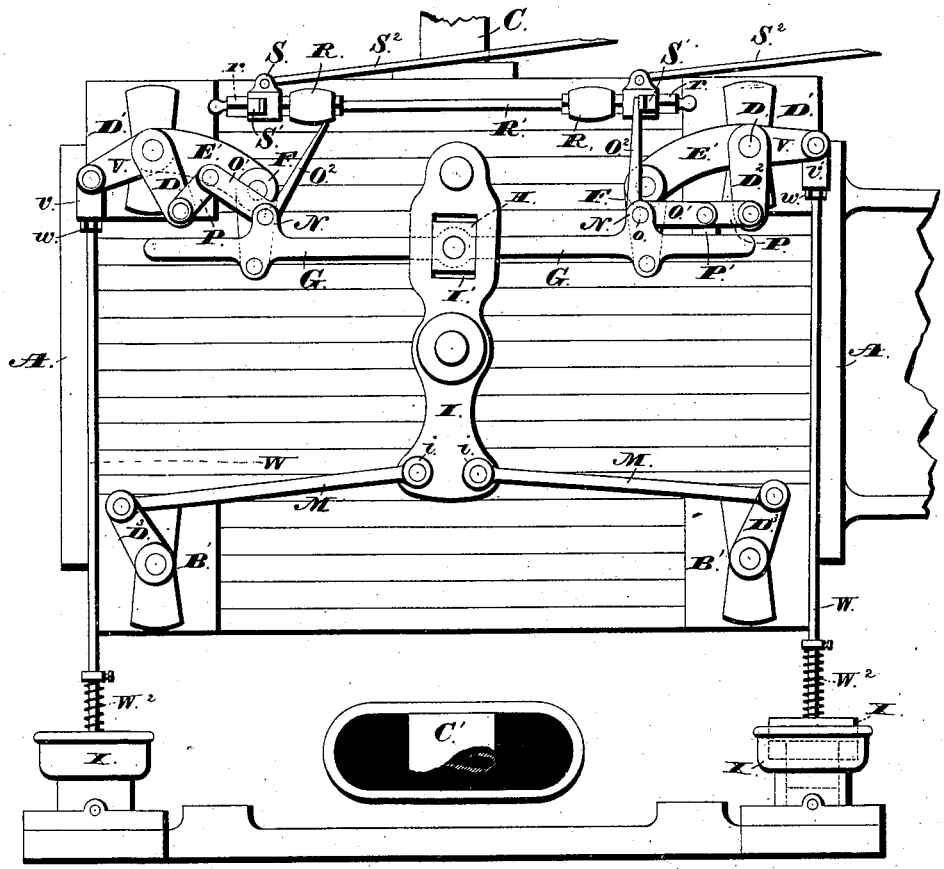
Figure 4:
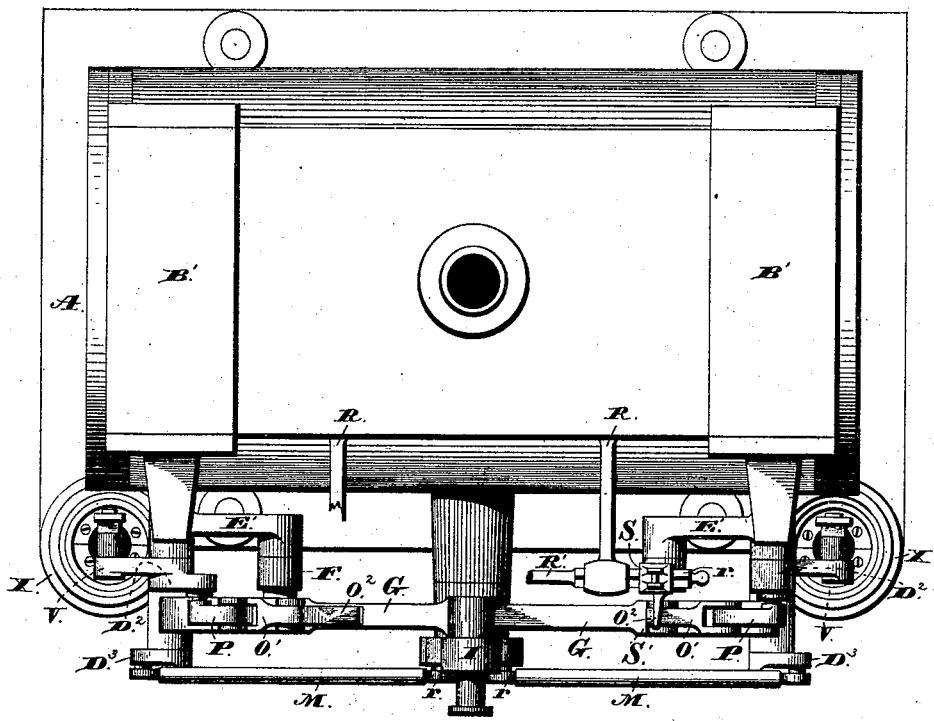
Figure 5:
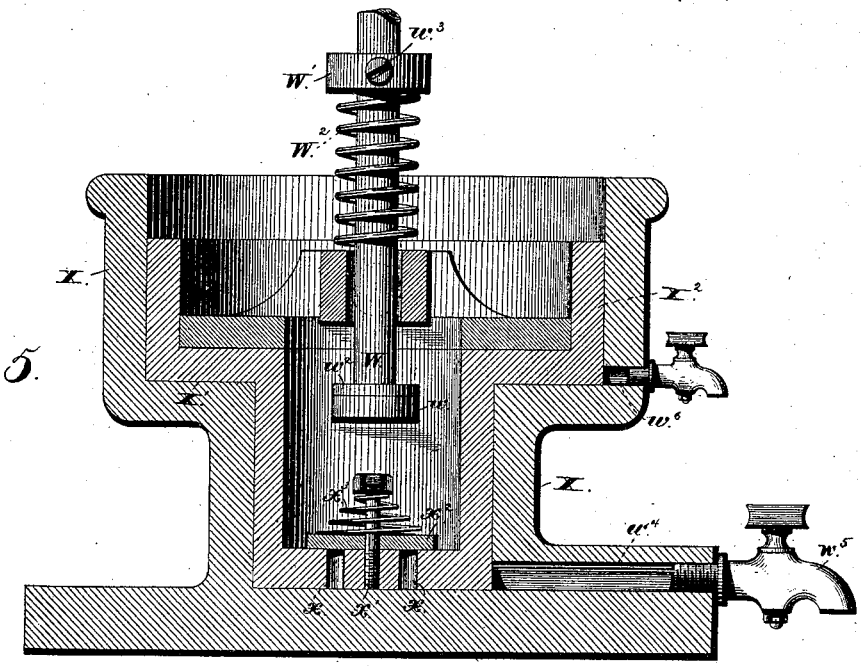
Figure 6:
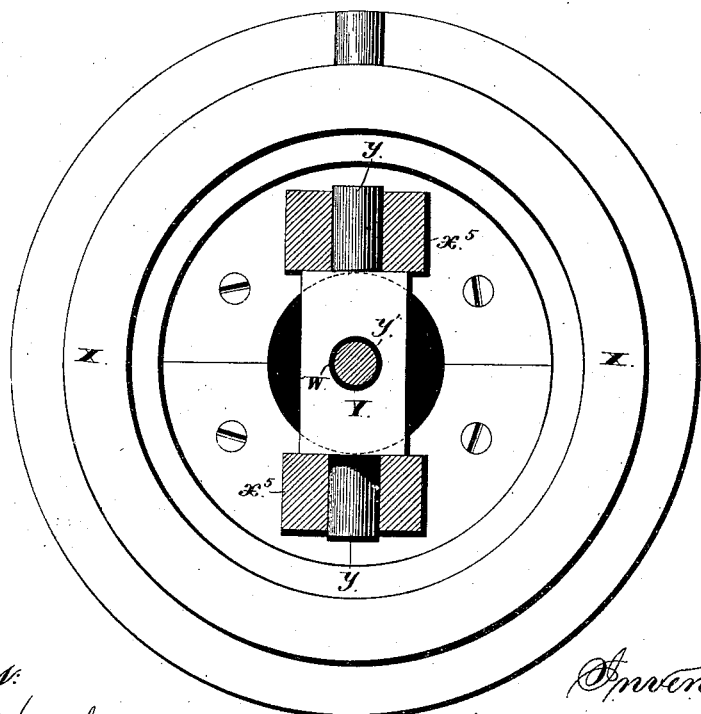

Figure 1 shows a view in side elevation of an engine provided with my improved valve gear or mechanism; Fig. 2, a detail enlarged view in elevation of the valve mechanism, with the parts in position as before one of the inlet-valves is opened; Fig. 3, a similar view, with the parts in position as when such valve is opened to its full extent; Fig. 4, a plan view of the cylinder-casing and valve mechanism attached; Fig. 5, an enlarged detail sectional view of one of the dash-pots; Fig. 6, a detail plan view of the same.

Letters of like name and kind refer to like parts in each of the figures.

The object of my invention is to provide an improved valve-shifting mechanism; and to this end it consists in the construction, arrangement, and combination of parts, as hereinafter specified.

In the drawings, A designates the cylinder; B B, the inlet-valve boxes, and B' B' those of the exhaust-valves.

The frame and support for the engine and the various parts thereof do not form a part of my invention, and I therefore will not describe the same at length herein, though I prefer to have them as shown in the drawings.

C designates the steam-supply or inlet pipe, and C' the exhaust-pipe, properly connected with the inlet and exhaust valves, respectively, in any of the well-known ways desired.

The valves are of the kind used in the Corliss engine, each having a stem, D, projecting out through the valve-cover D'. Upon the outer end of each of these stems is fixed a crank, $D^2$, by which the stem is to be turned, as will be described hereinafter.

Hung upon suitable pivot-pins, E E, upon bracket-arms E' E', extending inward and downward from the valve-covers D' D' of the inlet-valve boxes, are the arms or idle cranks F F, pivotally connected at their lower ends with the bar G, so that the latter is given a parallel motion when reciprocated. At its middle point this bar has pivoted to it a rectangular block, H, forming a wrist-plate.

Journaled or pivoted to the cylinder or casing thereof below the bar is the lever I, provided near its upper end with an oblong slot or opening, I', in which plays the wrist plate or block H.

Connected with the upper end of lever I is the connecting-rod K, which at its other end is pivotally connected with the upper end of the lever L, which latter is vibrated by the eccentric-rod L' and eccentric $L^2$, on the main shaft $L^3$.

Pivotally connected with the lower end of the lever at different points $i\ i$, are the two rods M M, which at their other ends are pivoted to the cranks $D^3\ D^3$ on the stems of the opposite exhaust-valves, so that as the lever is swung on its pivot by the eccentric through the connections described, these valves will be alternately opened and closed, as in the valve mechanism heretofore used in the Corliss engine.

On the upper side of bar G, above the points at which it is pivoted to the idle cranks or links F F, are the lugs or projections N N, to which are pivoted the right-angled or elbow levers O O on pins $o\ o$, passing through their angles into such lugs or projecting portions of the bar. The horizontal arms O' O' of these levers extend in opposite directions outward toward the ends of the bar G. Pivoted to the outer end of these lever-arms and to the cranks on the valve-stems of the inlet-valves are the links P P, forming, with such lever-arms, toggles for operating the valve-stem cranks, as will be described hereinafter. The inner end of each of these links is provided with a downwardly-projecting portion or lug, P', which, by striking on top of the bar G, as shown in the drawings, acts as a stop to limit the downward movement of and support the middle of the toggle. This lug is of such height as to allow the pivotal pin connecting the ends of the two parts of the toggle to fall slightly below a straight line between the pin on the crank attached to the valve-stem and the pivotal point of the elbow-lever O.

The swinging supporting-links for the bar

G are made of the same length as the crank-arms on the valve-stems, so that as the bar moves outward and swings one of the valve-cranks in that direction the crank-pin and the pivotal point of the toggle-lever will be kept in the same line, passing just above the pivot of the toggle-link. With the parts in such position, with lug P' of one of the toggles resting upon bar G, as shown in the drawings, Fig. 2, if the bar be reciprocated outward, as endwise pressure upon the toggle cannot cause it to flex or fly up, the valve-crank will be swung outward to open the valve.

Were no means provided for swinging the middle of the toggle upward, obviously the outward swing of the valve-crank would continue as long as the bar moved outward. To prevent this continued opening of the valve and to cause it to close and cut off the steam from the cylinder at the proper point in the travel of the piston, as in the Corliss engine, I provide means for tripping the toggle at the desired point and swinging the crank on the valve-stem inward again to close the valve.

The toggles are pivoted to the bar G at such points with relation to the valves and valve-cranks that as the bar reaches the end of the swing in one direction the toggle at the opposite end of the bar will be straightened or brought down so that the supporting-lug on the toggle-link, hereinbefore described, will rest upon the top of bar G. Meantime the other toggle has been flexed or tripped to close the valve with which it is connected.

For properly tripping each toggle I have provided automatically-adjustable means, which, as the speed of the engine increases or diminishes on account of change in load or in the steam-pressure from the source of supply, will trip the toggle to close the valves earlier or later in the stroke of the piston, so as to keep the action of the engine quite uniform.

Extending outward from the upper portion of the cylinder or its frame are the two bracket-arms R R, supporting the bar R', which at its ends extends through and beyond the receiving-sleeves on the ends of arms R R. The end portions, $r$ $r$, of this bar are squared or made angular, as shown. If desired, they can be made with a spline or feather; but I prefer to make them as shown and described. Upon each of these squared ends is a sleeve, S, fitting and sliding thereon. From these sleeves or slides lugs or toes S' S' extend outward in the track of the upper ends of the upright arms $O^2$ $O^2$ of the elbow-levers O O as such levers are carried outward alternately by the movements of bar G. To automatically regulate the positions of these tripping-toe slides on the slide-bar, so that the ends of the toggle-levers will engage them at the proper times to keep the power uniform, I connect each slide by means of a link or connecting-rod, $S^2$, with one end of a lever, T, preferably pivoted upon the governor-standard. With this construction, if the lever T be rocked on its pivot in one direction or the other, the slides will be pulled farther apart or brought nearer together, thus bringing the tripping-toes into position to be struck by the toggle-lever ends later or earlier in the stroke. From the side of this lever extends the horizontal arm T', with which is connected the rod U, attached at its upper end to the collar $n$, which is raised and lowered by the action of the governor in the well-known way. With this construction, if the speed of the engine tends to increase because of change in load or in pressure of the steam from the source of supply, the rod U is pulled up and the lever T is rocked on its pivot to draw the farther slide and push the other one inward to bring them nearer each other, so that the toggle-levers will be operated to close the inlet-valves earlier in the outward movement of the bar G, actuated from the eccentric, as described hereinbefore. When the speed decreases, the lever T is caused by the governor to rock the other way to force the slides apart, so that the inlet-valves will remain open through a greater portion of the stroke of the piston. Thus compensation is made for changes in load or in the pressure of the steam from the source of supply, and the power is maintained the same.

Attached to or rigidly connected with the crank on each inlet-valve stem is a second crank-arm, V, extending outward. To the end of this arm is provided a screw-sleeve, $v'$. Into this is screwed the upper end of rod W, and upon such rod just below the sleeve, is a set or lock nut, $w$. Below this rod is a dash-pot, X, having its lower portion smaller than the upper part. The bottom of the latter is made flat, so as to form the annular shoulder X' between the two portions of the pot. Within this dash-pot fits the hollow-cup piston $X^2$, conforming in shape with the interior of the dash-pot, so that when the piston is down the enlarged upper portion of it rests squarely upon the shoulder X'. The lower end of this piston is provided with several openings, $x$ $x$.

Resting upon the bottom of the piston, and held in place thereon by the screw $x'$, is the disk or piece of leather $x^2$, which is normally held down to close the openings $x$ $x$ by the spring $x^3$ engaging the head of the screw and pressing down upon the lever, which forms a flexible flap-valve.

Within the upper enlarged portion of the piston are the two journal-boxes $x^5$ $x^5$, fastened upon the flat annular shoulder formed by the bottom of such enlarged portion of the piston. In these boxes are journaled the pivots $y$ $y$ on the ends of block Y. Down through a central vertical opening, $y'$, in this pivoted block extends the lower portion of rod W. Upon the lower end of this rod is a head, $w'$, upon the upper face of which is the washer or cushion $w^2$, preferably of leather.

On the rod above the block Y is an adjustable collar, W', provided with a set-screw, $w^3$, by means of which it can be fixed upon the rod. Between this collar and the top of block Y is a spring, $W^2$, surrounding the rod. An opening, $w^4$, is bored through the casing of the dash-pot communicating with the bottom of the interior of the pot. I contemplate attaching a pet-cock, $w^5$, to the outer end of this passage or opening, to allow, if desired, a certain amount of air to flow into the pot as the piston rises therein, or to shut off all communication between the bottom of the pot and the atmosphere.

I contemplate, also, making one or more small holes, $w^6$, through the walls of the pot, opening into the interior of the enlarged upper portion thereof just above the annular shoulder $X'$, for a purpose to be set forth. These can also be provided with pet-cocks or valves.

Each rod W is of such length that the head on its lower end does not come in contact with the pivoted block Y as the rod is raised by the swinging of the crank-arm attached to the inlet-valve stem until just as the valve is being opened.

As the valve-stem and the cranks thereon are rotated further to open the valve, the piston within the dash-pot will be raised, as indicated in Fig. 3. As the piston is thus raised, if the pet-cock $w^5$ be closed a vacuum will be formed below the piston end in the dash-pot. This vacuum obviously causes a downward pull upon the piston and rod, so that when they are free to fall they will be drawn down again quickly. As the piston rises in the dash-pot, the leather valve closes the openings $x\ x$ so that no air can get through them to the space below the piston.

As the piston descends, if there is any air in the space below it, it will escape freely up through the openings $x\ x$, forcing the valve upward. The fall of the piston will then not be interfered with by the presence of any air below it.

As the piston rises so that the bottom of its enlarged upper portion leaves the annular shoulder within the pot, air rushes in below it through the openings $x\ x$ in the dash-pot wall. When the piston descends again, as it does quickly, this air in between the enlargement of the piston and the shoulder $X'$ forms a cushion to break the shock of fall of the piston and prevent jar. The rate of escape of this air can be regulated, if desired, by the suggested pet-cocks, though such are not necessary.

As the rod falls in closing the valve, the spring $W^2$ takes up its momentum and without jar checks the fall of the rod, so as to prevent too great swing of the valve-crank.

With this construction, also, none of the weight of the rod is applied to the piston until after the latter has settled down within the dash-pot, and then only a portion of the weight of the rod comes upon it through the spring. The air-cushion device within the dash-pot has then only to stop the fall of the piston, which it can do effectually without jar.

The stress of spring $W^2$ can be nicely adjusted by fixing the collar $W'$ higher or lower on the rod.

The form of the valve at the bottom of the piston can obviously be changed as desired, and any other of the well-known forms of valves adapted to close the openings in the piston-bottom as the piston rises can be used.

The operation of my mechanism is as follows: The operation of the lever in opening and closing the exhaust-valves is substantially the same as the operation of the well-known mechanism heretofore used in the Corliss form of engine, and need not be described.

With the parts as shown in Fig. 2 the bar G has completed its swing or movement to the left or toward the rear end of the cylinder. The inlet-valve at this end has just been closed. The inlet-valve at the other end is also still closed. As the rod moves back to right or forward end of the cylinder, the toggle at that end of the bar pushes the crank on the valve-stem outward to open the valve. This swinging of the valve-crank raises the crank-arm and the attached rod, and so raises the piston of the dash-pot. Such raising of the piston causes a vacuum, as described, below it within the dash-pot. The opening of the valve continues with the movement of bar G until the upright arm of the toggle-lever strikes the tripping lug or toe on the slide above. Further outward movement of the bar then causes such arm to be thrown back, thus raising the end of the horizontal arm of the lever above the line between the pivot of the lever and the crank-pin on the valve-crank. As the toggle is thus flexed or thrown up, the vacuum under the piston in the dash-pot pulling down on the rod W, together with the weight of the rod itself, quickly draws down crank-arm V and closes the valve. As the toggle is thrown up, it no longer offers any resistance to the swinging back of the valve-crank, even while the bar G continues to move outward. The toggle-lever link and valve-crank then take the same positions as they are shown as having at the left of the figure referred to. As the bar continues its outward or forward movement, the toggle at its rear end is straightened out or brought down until the lug $P'$ on the toggle-link rests upon the bar G, as did that of the other toggle-link before the bar started in its forward movement. As the bar swings rearward again, the inlet-valve will then be operated in precisely the same way as the other.

The action of the dash-pots is set forth sufficiently hereinbefore, as also is that of the mechanism for automatically regulating the position of the tripping-toe carrying-slides to bring them nearer to each other or farther apart as the steam-pressure increases or diminishes, so as to trip the toggle-levers and allow the valves to be closed earlier or later in the stroke of the piston within the cylinder.

I do not claim herein, broadly, in connection with the valve-operating toggle, means for preventing the centers of the toggles from falling too low; nor do I claim as my invention a toggle in which one link is provided with an angle or lug adapted to come in contact with a portion of or a lug on the other link, so as to prevent the middle of the toggle from falling below the line of its ends.

Having thus described my invention, what I claim is—

1. In a valve mechanism, in combination with the crank on the valve-spindle, the endwise-moving bar, a toggle pivotally attached at one end to the bar and at the other to the valve-crank, a device for tripping or flexing the toggle, and a pendent link supporting the end of the bar near the point of connection of the toggle therewith, substantially as and for the purpose described.

2. In combination with the longitudinally-moving bar, the crank on the piston-spindle, a toggle connected at one end with the bar and at the other with the valve-crank, adapted to swing the crank to open the valve as the bar moves outward, a pendent link supporting the bar swinging parallel with the valve-crank as the latter is swung to open the valve, means, substantially as described, for tripping or flexing the toggle, and a device or devices for swinging the valve-crank back to close the valve when the toggle is tripped, substantially as and for the purpose described.

3. In combination with the valve, and means, substantially as described, tending to keep it closed, a crank on the valve-stem, a longitudinally-moving bar, a toggle pivoted at one end to the bar and at the other to the crank, a lug on the inner end of one of the toggle-links adapted to rest on the bar and support the middle of the toggle, a lug or arm on a portion of the toggle, and a tripping-toe adapted to be engaged by such arm or lug, substantially as and for the purpose described.

4. In combination with the moving bar and the crank-arm on the valve-stem, the elbow-lever pivoted to the bar, the link pivoted to the horizontal arm of the lever and the valve-crank and provided with a supporting-lug adapted to rest on the bar when the pivotal connection of the link and lever is below the line of the crank-pin and pivot of the lever, a tripping lug or toe adapted to be engaged by the upright arm of the lever, a second crank-arm connected with the valve-stem, and means, substantially as described, adapted to exert a yielding force upon this crank, substantially as and for the purpose described.

5. In combination with the tripping toe or lug, the reciprocating or swinging bar, the elbow-lever pivoted thereto, having its upright arm adapted to engage the toe or lug, the crank on the valve-stem, the link pivoted to the horizontal arm of the lever and to the crank, the second crank rigidly connected with the valve-stem, the rod connected with this crank, a piston on the lower end of this rod, and a cylinder or pot in which the piston works, substantially as and for the purpose described.

6. In combination with the supporting pendent link, the bar pivoted thereto, the elbow-lever pivoted on the bar, the two crank-arms on the valve-stem, the link connecting the horizontal arm of the lever with the crank extending down from the valve-stem, the lug on this link, the rod connected with the other crank on the valve-stem, the piston on the rod working in a dash-pot closed at its lower end, and a tripping lug or toe adapted to be engaged by the upright arm of the lever as the bar moves outward, substantially as and for the purpose described.

7. In a valve mechanism, the valve-shifting bar, in combination with the swinging links to which it is pivoted, the wrist-block pivoted to the bar, a pivoted lever provided with a slot engaging the wrist-block, and suitable connections between the eccentric on the main shaft and this lever, substantially as and for the purpose described.

8. In combination with the two rotary inlet-valves, and the cranks on the stems thereof, the swinging bar, the two elbow-levers pivoted to the bar and having their horizontal arms extending outward toward the valve-cranks, and their other arms extending upward, the links pivoted to the ends of the horizontal arms of the levers and to the cranks, the lugs on the links adapted to rest on the bar when the links are down, the lugs adapted to be engaged by the upright arms of the toggle-levers as they travel outward with the bar, and means, substantially as described, tending to rotate the valve-stems and cranks inward to close the valves, all substantially as and for the purpose described.

9. In combination with the slides carrying the tripping toes or lugs for the valve mechanism, the bar upon which the slides move, the pivoted lever, rods connecting the slides with opposite ends of the lever, an arm or lug on the lever, a governor, and a rod connecting the lug or arm on the lever with the governor, substantially as and for the purpose described.

10. In combination with the supporting-bar having angular portions, the slides sliding on such portions, the tripping lugs or toes on these slides, the pivoted lever, the rods connecting the slides with the opposite ends of the lever, and means, substantially as described, for swinging the lever on its pivot in opposite directions as the speed of the engine increases or diminishes, substantially as and for the purpose described.

11. In combination with the crank-arm rigidly connected with the valve-stem, a rod pivoted at its upper end to the crank-arm, a cup-shaped piston on the lower end of the rod, having one or more openings in its bottom, and a valve adapted to close the same against downward pressure of the air, and a dash-pot within which the piston fits and works, substantially as and for the purpose described.

12. In combination with the dash-pot, the cup-shaped piston fitting therein, provided in its bottom with one or more openings, a disk or piece of flexible material resting upon the bottom of the piston over such opening or openings, a screw or bolt passing down through the disk and holding it in place, and a spring between the head of the bolt and the disk, substantially as and for the purpose described.

13. In combination with the dash-pot and the piston playing therein, a block attached to the piston, the rod connected with the valve having its lower end extending down through the block, the head on the rod below the block, the collar on the rod above the block, and the spring surrounding the rod between the collar and block, substantially as and for the purpose described.

14. In combination with the valve and the crank-arm on its stem, the dash-pot, and the piston therein, the rod connected at its upper end with the crank-arm and at its lower end so connected with the piston in the dash-pot as not to raise the piston until just as the valve begins to open, substantially as and for the purpose described.

15. In combination with the dash-pot, the cup-shaped piston, the block pivoted in the upper part thereof and provided with a central vertical opening, the rod passing down through such opening, the head on the lower end of the rod, the collar on the rod above the block, and a spring around the rod between the block and collar, substantially as and for the purpose described.

16. In combination with the dash-pot having its upper portion made larger than the lower and the bottom of such upper portion forming an annular shoulder within the pot, the cup-piston conforming in external shape to the interior of the pot, a valve at the bottom of the piston adapted to close against the passage of air down below the piston while allowing it to escape from under the same, and one or more openings extending through the wall of the pot just above the shoulder within the same, substantially as and for the purpose described.

17. In combination with the dash-pot having its upper portion made larger than its lower part, and one or more air-openings extending through its walls at the bottom of the enlarged portion, the cup-piston conforming in shape to the interior of the pot, the valve at the bottom of the piston, the journal-boxes fixed within the upper portion of the piston, the block pivoted in such boxes and provided with a central opening, the rod extending loosely down through the opening, the head on the rod, the adjustable collar on the rod above the block and the spring between the block and collar, substantially as and for the purpose described.

18. In combination with the dash-pot and the cup-piston therein, a block or bar carried within the piston and provided with a central opening, a crank-arm attached to the valve-stem, a rod extending from this arm down through the opening in the bar or block within the piston, a head so situated on the lower end of the rod as to come in contact with the lower side of the bar or block just as the valve opens, a collar on the rod above the block, and a spring between the block and collar, substantially as and for the purpose described.

In testimony that I claim the foregoing I have hereunto set my hand this 3d day of December, 1884.

CHAS. A. DIXON.

Witnesses:
WILLIAM FITCH,
PHILIP G. RUSSELL.